United States Patent
Hu

(10) Patent No.: US 10,524,295 B2
(45) Date of Patent: Dec. 31, 2019

(54) ENVIRONMENTAL SURVEILLANCE SYSTEM AND METHOD OF DRIVING PORTABLE INFORMATION CAPTURE DEVICE

(71) Applicant: GETAC TECHNOLOGY CORPORATION, Hsinchu County (TW)

(72) Inventor: Chien-Chih Hu, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 39 days.

(21) Appl. No.: 15/446,188

(22) Filed: Mar. 1, 2017

(65) Prior Publication Data

US 2018/0061200 A1     Mar. 1, 2018

Related U.S. Application Data

(60) Provisional application No. 62/382,718, filed on Sep. 1, 2016.

(51) Int. Cl.
*H04W 76/10*     (2018.01)
*G08B 13/196*     (2006.01)
*H04N 7/18*     (2006.01)
*G08B 25/00*     (2006.01)

(52) U.S. Cl.
CPC ...... *H04W 76/10* (2018.02); *G08B 13/19695* (2013.01); *G08B 25/009* (2013.01); *H04N 7/188* (2013.01); *G08B 13/1966* (2013.01); *G08B 13/19697* (2013.01)

(58) Field of Classification Search
CPC .......... G08B 13/1966; G08B 13/19695; G08B 25/009; G08B 13/19697; H04N 7/188; H04W 76/10
See application file for complete search history.

(56) References Cited

U.S. PATENT DOCUMENTS

| | | | |
|---|---|---|---|
| 2003/0041329 A1* | 2/2003 | Bassett | H04N 7/173 |
| 2009/0215400 A1* | 8/2009 | Chang | H04W 48/08 |
| | | | 455/67.14 |
| 2010/0208068 A1* | 8/2010 | Elsemore | A01M 31/002 |
| | | | 348/143 |

(Continued)

FOREIGN PATENT DOCUMENTS

| | | |
|---|---|---|
| CN | 103057519 A | 4/2013 |
| CN | 204258959 U | 4/2015 |

*Primary Examiner* — Benjamin R Bruckart
*Assistant Examiner* — Anthony Bantamoi

(57) ABSTRACT

An environmental surveillance system includes at least one status sensor, a control device, and at least one portable information capturing device. The control device is coupled to the status sensors to send a broadcast packet in accordance with sensing signals generated from the status sensors. The broadcast packet includes a broadcast data. The broadcast data includes an actuation command. The at least one portable information capturing device receives the broadcast packet and compares a match data with the broadcast data in the broadcast packet. When the match data matches the broadcast data, the at least one portable information capturing device starts a media capturing procedure in accordance with the actuation command.

16 Claims, 4 Drawing Sheets

(56) References Cited

U.S. PATENT DOCUMENTS

| | | | |
|---|---|---|---|
| 2012/0033140 A1* | 2/2012 | Xu | H04N 21/42224 |
| | | | 348/734 |
| 2014/0218527 A1* | 8/2014 | Subramanya | G08G 1/143 |
| | | | 348/148 |
| 2014/0247360 A1* | 9/2014 | Trundle | G08B 13/19639 |
| 2014/0354402 A1* | 12/2014 | Joao | G07C 9/00158 |
| 2017/0059265 A1* | 3/2017 | Winter | F41A 17/08 |
| 2017/0284754 A1* | 10/2017 | Chakraborty | F41J 5/10 |
| 2018/0020007 A1* | 1/2018 | Jesurajan | H04L 63/123 |

* cited by examiner

ENVIRONMENTAL SURVEILLANCE SYSTEM AND METHOD OF DRIVING PORTABLE INFORMATION CAPTURE DEVICE

BACKGROUND OF THE INVENTION

Field of the Invention

The present invention relates to wireless control technology and, more particularly, to an environmental surveillance system and a method of driving a portable information capturing device.

Description of the Prior Art

In general, conventional portable information capturing devices capture media data, such as images and sounds. Due to increasing awareness among the public of personal safety, it is advantageous for portable information capturing devices to take on a safety-enhancing role because of their portability and capability of capturing real-time information, thereby widening their applications. For instance, it is advantageous for police officers on duty to carry portable information capturing devices to not only assist the police officers in policing but also allow media data captured by the portable information capturing devices to serve as evidence presented to a court of law.

In practice, a user turns on a switch of a conventional portable information capturing device and thereby enables the portable information capturing device to capture information in real time. However, in the situation where an emergency occurs, the user often fails to timely turn on the switch of the portable information capturing device manually, or is usually too late to capture images and/or sounds pertaining to a crucial scenario even though the switch of the portable information capturing device has been turned on.

SUMMARY OF THE INVENTION

In an embodiment, an environmental surveillance system comprises at least one status sensor, a control device, and at least one portable information capturing device. The control device is coupled to the status sensors. The status sensors sense an environmental status to generate at least one sensing signal. The control device sends a broadcast packet in accordance with the at least one sensing signal. The broadcast packet includes a broadcast data. The broadcast data includes an actuation command. The at least one portable information capturing device receives the broadcast packet and compares a match data with a broadcast data. When the match data matches the broadcast data, the at least one portable information capturing device starts a media capturing procedure in accordance with the actuation command.

In an embodiment, a method of driving a portable information capturing device comprises the steps of: using at least one status sensor to sense an environmental status and generate at least one sensing signal; and sending a broadcast packet in accordance with the at least one sensing signal. The broadcast packet includes an actuation command for actuating the portable information capturing device to capture a media data.

In conclusion, an environmental surveillance system and a method of driving a portable information capturing device according to the present invention are characterized in that, in case of an emergency, the portable information capturing device starts instantly and automatically to capture media data so as to instantly and automatically record environmental images and/or sounds which the emergency is accompanied by. In some embodiments, the portable information capturing device is normally in a shutdown status, a sleep status, or an idle status and thus will be actuated only in case of an emergency. Accordingly, the portable information capturing device advantageously features minimized power consumption and an extended operating session.

DETAILED DESCRIPTION OF THE EMBODIMENTS

Figure 1:
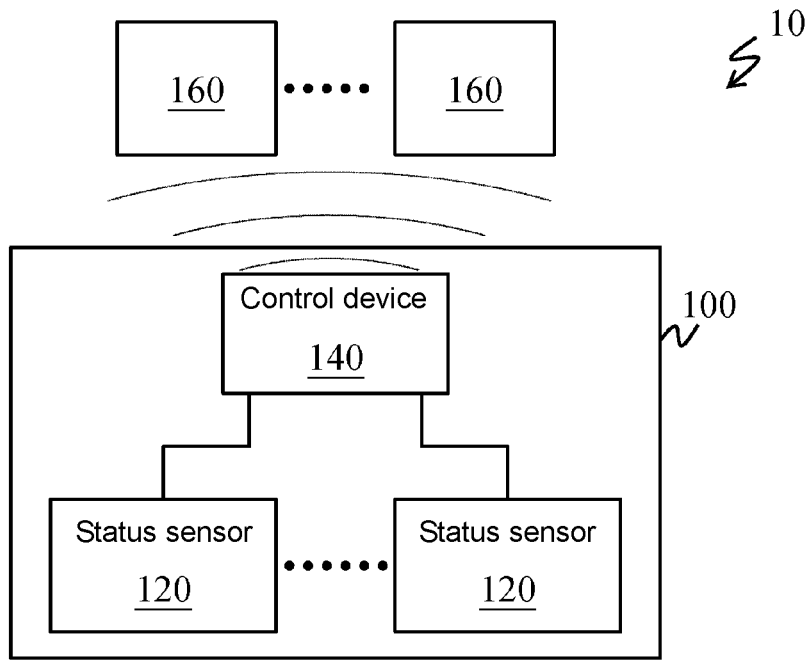
FIG. 1 is a schematic view of an environmental surveillance system according to an embodiment of the present invention.

FIG. 1 is a schematic view of an environmental surveillance system according to an embodiment of the present invention. Referring to FIG. 1, the environmental surveillance system 10 comprises one or more status sensors 120, a control device 140, and one or more portable information capturing devices 160. The control device 140 is coupled to the status sensors 120. For illustrative sake, the portable information capturing device 160 of the environmental surveillance system 10 in an embodiment of the present invention is in the number of one, but the present invention is not limited thereto.

Figure 2:
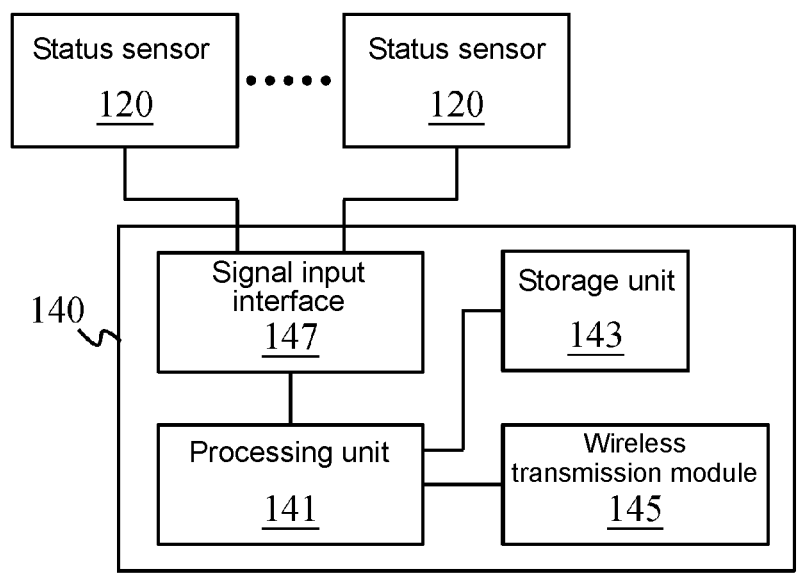
FIG. 2 is an exemplary function block diagram of a control device of FIG. 1.

FIG. 2 is an exemplary function block diagram of the control device 140 of FIG. 1. Referring to FIG. 1 and FIG. 2, in some embodiments, the control device 140 at least comprises a processing unit 141, a storage unit 143, a wireless transmission module 145, and a signal input interface 147. The processing unit 141 is coupled to the storage unit 143, the wireless transmission module 145, and the signal input interface 147. The signal input interface 147 is coupled to the status sensors 120. The wireless transmission module 145 supports short-distance wireless transmission technology.

Figure 3:
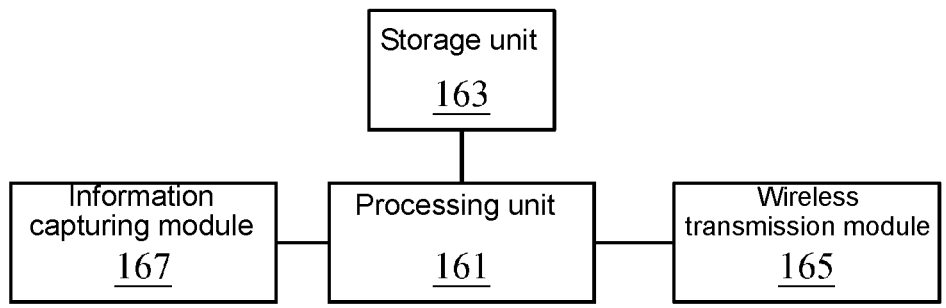
FIG. 3 is an exemplary function block diagram of a portable information capturing device of FIG. 1.

FIG. 3 is an exemplary function block diagram of the portable information capturing device 160 of FIG. 1. Referring to FIG. 1 and FIG. 3, in some embodiments, the portable information capturing device 160 at least comprises a processing unit 161, a storage unit 163, a wireless transmission module 165, and an information capturing module 167. The processing unit 161 is coupled to the storage unit 163, the wireless transmission module 165, and the information capturing module 167. The wireless transmission module 165 supports short-distance wireless transmission technology.

Figure 4:
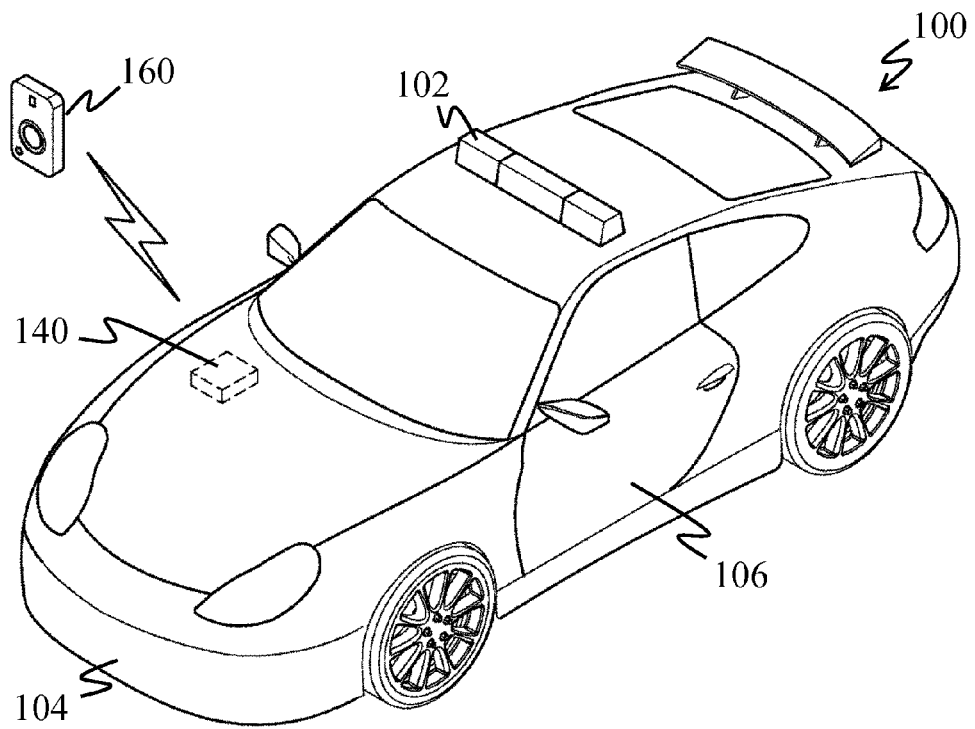
FIG. 4 is a schematic view of operation of the environmental surveillance system of FIG. 1.

FIG. 4 is a schematic view of operation of the environmental surveillance system of FIG. 1. Referring to FIG. 1 and FIG. 4, in some embodiments, the status sensors 120 and the control device 140 are fixedly mounted on a mobile vehicle 100. The portable information capturing device 160 is movably disposed on the body of a user (for example, a driver or a passenger) carrying the mobile vehicle 100. In some embodiments, the portable information capturing device 160 is worn at any part of the body (for example, the head or the chest) of the user or carried manually by the user to move together with the user, but the present invention is not limited thereto.

Figure 5:
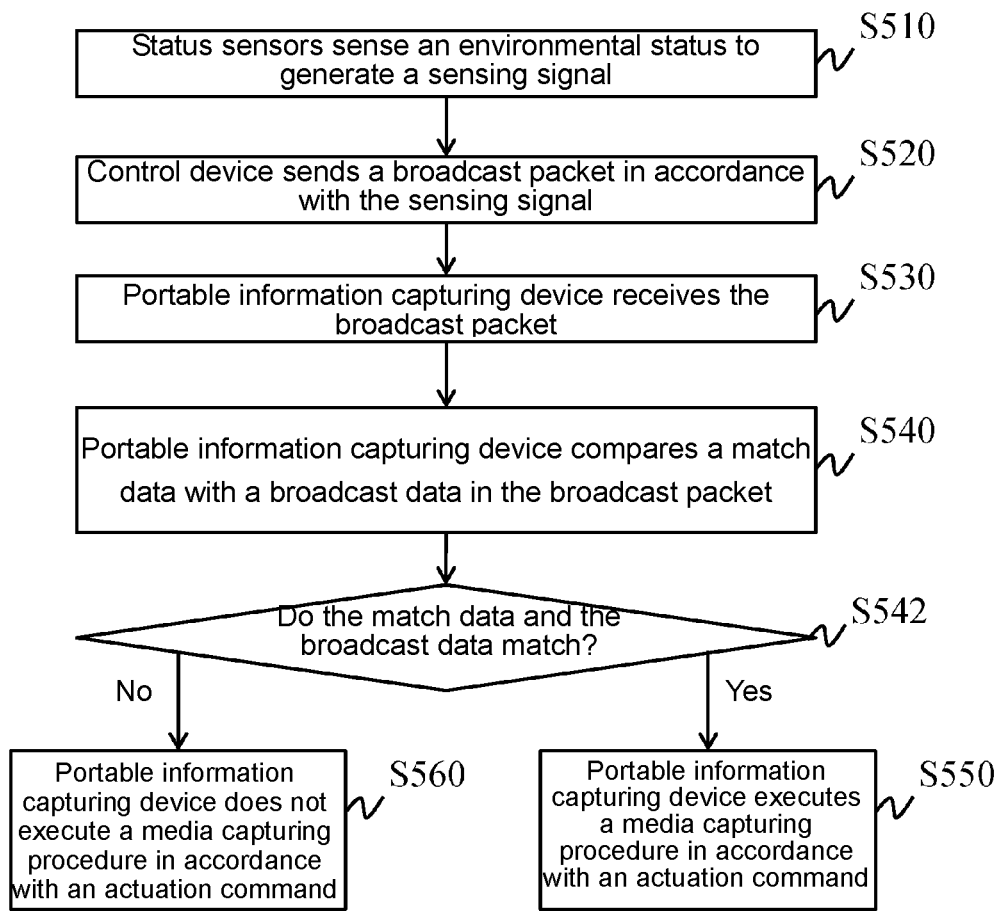
FIG. 5 is a flowchart of a method of driving a portable information capturing device according to an embodiment of the present invention.

FIG. 5 is a flowchart of a method of driving a portable information capturing device according to an embodiment of the present invention. Referring to FIGS. 1~5, the status sensors 120 sense an environmental status to generate at least one sensing signal (step S510). In some embodiments, the status sensors 120 are each an alarm device 102, an engine heat-sensing device connected to an engine of the mobile vehicle 100, a collision sensing device connected to vehicular bodies 104, 106 of the mobile vehicle 100, a car anti-theft device of the mobile vehicle 100, or an emergency braking system for the mobile vehicle 100. For example, the alarm device 102 actuates its alarm to generate a sound and sends a sensing signal to the control device 140. Alternatively, after detecting that the engine of the mobile vehicle 100 has been overheated, the engine heat-sensing device not only sends an overheated alert to a master control device of the mobile vehicle 100, but also sends a sensing signal to the control device 140. Alternatively, after detecting that a collision has occurred to the mobile vehicle 100, the collision sensing device not only sends a collision alert to a master control device of the mobile vehicle 100, but also sends a sensing signal to the control device 140. Alternatively, after detecting an abnormal intrusion into the mobile vehicle 100, the car anti-theft device not only actuates an anti-theft alarm to generate a sound, but also sends a sensing signal to the control device 140. Alternatively, as soon as the emergency braking system of the mobile vehicle 100 begins to execute emergency braking, it sends a sensing signal to the control device 140.

The processing unit 141 receives the sensing signal through the signal input interface 147 and controls, in accordance with the sensing signal, the wireless transmission module 145 to send a broadcast packet (step S520). The wireless transmission module 145 sends the broadcast packet by broadcast. The broadcast packet includes a broadcast data. The broadcast data includes an actuation command. The broadcast data is preconfigured and stored in the storage unit 143 of the control device 140.

The wireless transmission module 165 of the portable information capturing device 160 scans/detects for radio frequency (RF) signals within its effective coverage. The portable information capturing device 160 falls within the effective coverage of the wireless transmission module 145. The wireless transmission module 165 receives the broadcast packet from the control device 140 (step S530).

After the wireless transmission module 165 has received the broadcast packet from the control device 140, the processing unit 161 compares a match data with a broadcast data in the received broadcast packet (step S540) to determine whether the match data and the broadcast data match (step S542). The match data is preconfigured and stored in the storage unit 163. After the broadcast packet has been received, the processing unit 161 reads the match data from the storage unit 163 and then compares the match data with the broadcast data.

In some embodiments, the broadcast data not only includes the actuation command, but also includes a profile data. The processing unit 161 compares the match data with the profile data in the received broadcast packet to determine whether they match.

When it is determined that the match data and the broadcast data match (for example, when the profile data matches the match data), the processing unit 161 starts the information capturing module 167 in accordance with the actuation command in the received broadcast packet, so as for the information capturing module 167 to execute a media capturing procedure (step S550). In the course of the execution of the media capturing procedure, the information capturing module 167 captures images and/or sounds pertaining to the surroundings so as to produce a media file, and then the media file produced by the information capturing module 167 is stored in the processing unit 161.

Conversely, if the match data and the broadcast data do not match (for example, when the profile data does not match the match data), the processing unit 161 does not start the information capturing module 167 in accordance with the actuation command in the received broadcast packet, and in consequence the information capturing module 167 does not execute the media capturing procedure (step S560).

In an embodiment, after receiving a sensing signal, the processing unit 141 controls, in response to the sensing signal, the wireless transmission module 145 to send the broadcast packet.

In another embodiment, after receiving a sensing signal, the processing unit 141 determines whether the sensing signal conforms with a corresponding restrictive criterion. It is only when the sensing signal does not conform with the corresponding restrictive criterion that the processing unit 141 controls the wireless transmission module 145 to send the broadcast packet, otherwise the processing unit 141 does not control the wireless transmission module 145 to send the broadcast packet. Restrictive criteria are preconfigured and stored in the storage unit 163 to correspond to the sensing signals generated from the status sensors 120. For example, if the status sensor 120 is the engine heat-sensing device, the engine heat-sensing device will send a data (sensing signal) indicative of the current temperature of the engine to the processing unit 141 of the control device 140. Then, the processing unit 141 reads from the storage unit 163 a temperature threshold (restrictive criterion) corresponding to the current temperature of the engine and determines whether the current temperature is lower than the temperature threshold (restrictive criterion). If the current temperature is not lower than the temperature threshold (does not conform with the restrictive criterion), the processing unit 141 will control the wireless transmission module 145 to send the broadcast packet.

Figure 6:
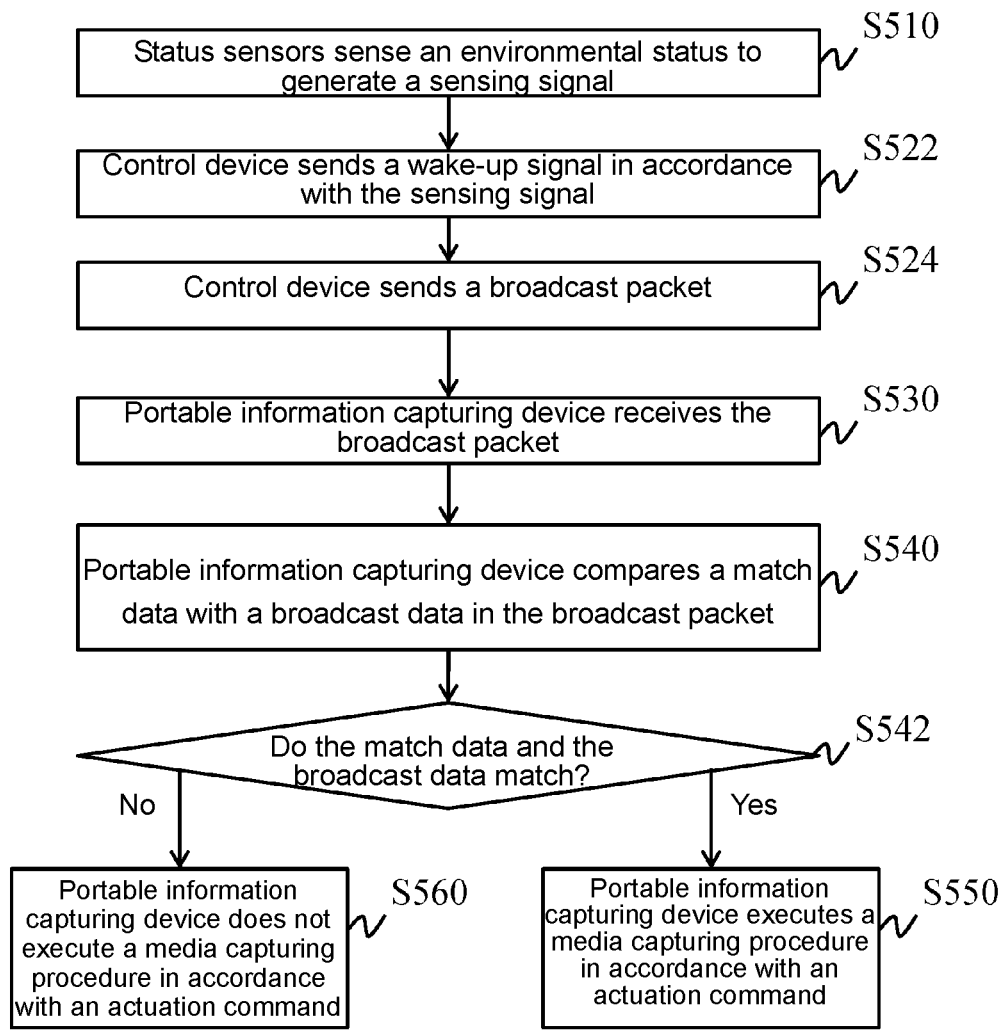
FIG. 6 is a flowchart of the method of driving a portable information capturing device according to another embodiment of the present invention.

FIG. 6 is a flowchart of the method of driving a portable information capturing device according to another embodiment of the present invention. In some embodiments, the portable information capturing device 160 is normally in a low-power-consumption status, such as a shutdown status and a sleep status, so that power is supplied to the wireless transmission module 165, but not to the processing unit 161, the storage unit 163, or the information capturing module 167. Referring to FIGS. 1~4 and 6, before the broadcast packet is sent, the processing unit 141 controls the wireless transmission module 145 to send a wake-up signal (step S522) for waking the portable information capturing device 160 up from the sleep status. After the wake-up signal has been sent (step S522), the processing unit 141 controls the wireless transmission module 145 to send the broadcast packet (step S524). Hence, after receiving the wake-up signal, the wireless transmission module 165 of the portable information capturing device 160 responds to the wake-up signal and thereby wakes up the portable information capturing device 160 in its entirety.

In an embodiment, after receiving a sensing signal, the processing unit 141 controls, in response to the sensing signal, the wireless transmission module 145 to send the wake-up signal. After the wake-up signal has been sent, the processing unit 141 controls the wireless transmission module 145 to send the broadcast packet.

In another embodiment, after receiving a sensing signal, the processing unit 141 determines whether the sensing signal conforms with a corresponding restrictive criterion. It is only when the sensing signal does not conform with the corresponding restrictive criterion that the processing unit 141 controls the wireless transmission module 145 to send the wake-up signal. After the wake-up signal has been sent, the processing unit 141 controls the wireless transmission module 145 to send the broadcast packet, otherwise the processing unit 141 does not control the wireless transmission module 145 to send the wake-up signal and the broadcast packet. Alternatively, after receiving a sensing signal, the processing unit 141 controls the wireless transmission module 145 to send the wake-up signal and determines whether the wake-up signal conforms with a restrictive criterion. It is only when the processing unit 141 determines that the wake-up signal conforms with the restrictive criterion that the processing unit 141 controls the wireless transmission module 145 to send the broadcast packet. If the processing unit 141 determines that the wake-up signal does not conform with the restrictive criterion, the processing unit 141 will not control the wireless transmission module 145 to send the broadcast packet. Restrictive criteria are preconfigured and stored in the storage unit 163 to correspond to the sensing signals generated from the status sensors 120.

In some embodiments, the control device 140 and the portable information capturing device 160 each come with another wireless transmission module (not shown) which supports big data transmission. The other wireless transmission module of the control device 140 creates a communication connection to the other wireless transmission module of the portable information capturing device 160, thereby allowing the portable information capturing device 160 to upload the stored media file to the control device 140 or upload the stored media file to a server-side (not shown) through the control device 140. The other wireless transmission module of the control device 140 further supports long-distance wireless transmission technology and thus can use the other wireless transmission module to create a communication connection to the server-side. Alternatively, the control device 140 further comprises a communication module whereby the control device 140 creates a communication connection to the server-side.

In some embodiments, the portable information capturing device 160 is a multimedia capturing device, such as a body-worn camera, a walkman, a recorder pen, and an event data recorder.

In some embodiments, each processing unit (141 or 161) comes in the form of one or more processing components. The processing components are each an SoC (System on a Chip), a CPU (central processing unit), or an MCU (microcontroller), but the present invention is not limited thereto.

In some embodiments, each storage unit (143 or 163) is provided in the form of one or more storage components. The storage components are non-volatile memory (such as ROM and flash memory) or volatile memory (such as RAM).

In some embodiments, the wireless transmission module 145 and the wireless transmission module 165 are configured for Bluetooth, such as Bluetooth High Speed and Bluetooth Low Energy (BLE), to effectuate data transmission with Bluetooth-enabled transmission modules. The broadcast packet is a Bluetooth-enabled broadcast packet. The wake-up signal is a Bluetooth-enabled broadcast packet too.

In some embodiments, the signal input interface 147 is a signal port.

In some embodiments, the media file includes multimedia data descriptive of images and/or sounds. In another embodiment, the media file not only includes multimedia data descriptive of images and/or sounds, but also includes data names, data types, and data configuration information of multimedia data.

In some embodiments, the mobile vehicle 100 is a means of transportation, such as a motorbike, a car, a truck, and a bus.

In some embodiments, the server-side comprises one or more hosts. Each host is an information processing device, such as a computer and a server.

In conclusion, an environmental surveillance system and a method of driving a portable information capturing device according to the present invention are characterized in that, in case of an emergency, the portable information capturing device starts instantly and automatically to capture media data so as to instantly and automatically record environmental images and/or sounds which the emergency is accompanied by. In some embodiments, the portable information capturing device is normally in a shutdown status, a sleep status, or an idle status and thus will be actuated only in case of an emergency. Accordingly, the portable information capturing device advantageously features minimized power consumption and an extended operating session.

Although the present invention is disclosed above by preferred embodiments, the preferred embodiments are not restrictive of the present invention. Changes and modifications made by persons skilled in the art to the preferred embodiments without departing from the spirit of the present invention must be deemed falling within the scope of the present invention. Accordingly, the legal protection for the present invention should be defined by the appended claims.

What is claimed is:

1. An environmental surveillance system, comprising:
   at least one status sensor for sensing an environmental status to generate at least one sensing signal, wherein said at least one status sensor is mounted on a vehicle;
   a control device coupled to the at least one status sensor to send a broadcast packet in accordance with the at least one sensing signal, the broadcast packet including a broadcast data, the broadcast data including an actuation command; and
   at least one portable information capturing device for receiving the broadcast packet to compare a match data with the broadcast data and start a media capturing procedure in accordance with the actuation command when the match data matches the broadcast data, wherein the at least one portable information capturing device is not mounted on the vehicle and is adapted to be movably disposed on a body of a user;
   wherein the at least one status sensor is at least one of an engine heat-sensing device detecting a temperature of an engine of the vehicle, a sensing device for detecting an occurrence of a collision of the vehicle, and an emergency braking system of the vehicle, and wherein, in response to the at least one sensing signal, and before sending the broadcast packet, the control unit sends a wake-up signal for waking the at least one portable information capturing device up from a sleep status.

2. The environmental surveillance system of claim 1, wherein the at least one status sensor senses the environmental status in accordance with a corresponding restrictive criterion and generates the sensing signal when measurement data of the environmental status does not conform with the corresponding restrictive criterion, thereby causing the control unit to send the broadcast packet.

3. The environmental surveillance system of claim 1, wherein the control unit compares the at least one sensing signal with a corresponding restrictive criterion and sends the broadcast packet when the at least one said sensing signal does not conform with the corresponding restrictive criterion.

4. The environmental surveillance system of claim 1, wherein the at least one portable information capturing device comprises: an information capturing module; a storage unit for storing the match data; a wireless transmission module for receiving the broadcast packet; and a processing unit coupled to the information capturing module, the storage unit, and the wireless transmission module to compare a match data with the broadcast data and start, in accordance with the actuation command, the information capturing module to execute the media capturing procedure when the match data matches the broadcast data.

5. The environmental surveillance system of claim 1, wherein the broadcast packet is a Bluetooth-enabled broadcast packet.

6. The environmental surveillance system of claim 1, wherein the wake-up signal is a Bluetooth-enabled broadcast packet.

7. The environmental surveillance system of claim 1, wherein the broadcast data further comprises a profile data, and the at least one portable information capturing device determines that the match data matches the broadcast data when the match data matches the profile data.

8. A method of driving a portable information capturing device, comprising the steps of:
using at least one status sensor to sense an environmental status and generate at least one sensing signal, wherein said at least one status sensor is mounted on a vehicle;
sending a broadcast packet in accordance with the at least one sensing signal, wherein the broadcast packet includes an actuation command for actuating the portable information capturing device to capture a media data; and
actuating the portable information capturing device to capture a media data according to the broadcast packet, wherein the at least one portable information capturing device is not mounted on the vehicle and is adapted to be movably disposed on a body of a user;
wherein the at least one status sensor is at least one of an engine heat-sensing device detecting a temperature of an engine of the vehicle, a sensing device for detecting an occurrence of a collision of the vehicle, and an emergency braking system of the vehicle; and
wherein the step of sending a broadcast packet in accordance with the at least one sensing signal comprises:
sending a wake-up signal in response to the at least one sensing signal to wake up the portable information capturing device from a sleep status; and
generating and sending the broadcast packet after the wake-up signal has been sent.

9. The method of driving a portable information capturing device of claim 8, wherein the step of using at least one status sensor to sense an environmental status and generate at least one sensing signal comprises: using the at least one status sensor to sense the environmental status in accordance with a corresponding restrictive criterion; determining that measurement data of the environmental status does not conform with the corresponding restrictive criteria; and generating the sensing signal in response to determining that the measurement data of the environmental status does not conform with the corresponding restrictive criterion; and wherein the step of sending a broadcast packet in accordance with the at least one sensing signal comprises: receiving the sensing signal and sending the broadcast packet in response to the sensing signal.

10. The method of driving a portable information capturing device of claim 8, wherein the step of sending a broadcast packet in accordance with the at least one sensing signal comprises: comparing the at least one sensing signal with a corresponding restrictive criterion; determining that the at least one sensing signal does not conform with the corresponding restrictive criteria; and sending the broadcast packet in response to determining that the at least one sensing signal does not conform with the corresponding the restrictive criterion.

11. The method of driving a portable information capturing device of claim 8, further comprising the steps of: receiving the broadcast packet and comparing a match data with the broadcast data in the broadcast packet by the portable information capturing device; determining that the match data matches the broadcast; and executing the media capturing procedure in accordance with the actuation command by the portable information capturing device in response to determining that the match data matches the broadcast data.

12. The method of driving a portable information capturing device of claim 11, wherein the broadcast data further includes a profile data, and the step of comparing a match data with the broadcast data in the broadcast packet comprises: determining that the match data matches the profile data; and determining that the match data matches the broadcast data in response to determining that it is determined that the match data matches the profile data.

13. The method of driving a portable information capturing device of claim 8, wherein the broadcast packet is a Bluetooth-enabled broadcast packet.

14. The method of driving a portable information capturing device of claim 8, wherein the wake-up signal is a Bluetooth-enabled broadcast packet.

15. The method of driving a portable information capturing device of claim 8, wherein the step of sending a broadcast packet in accordance with the at least one sensing signal comprises:
comparing the at least one sensing signal with a corresponding restrictive criterion; and
determining that the at least one sensing signal does not conform with the corresponding restrictive criterion;
wherein the step of sending a wake-up signal for waking the at least one portable information capturing device up from the sleep status further comprises determining whether the at least one sensing signal does not conform with the corresponding restrictive criterion, and sending a wake-up signal for waking up the portable information capturing device in response to determining that the at least one sensing signal does not conform with the corresponding restrictive criterion; and further comprising the step of generating and sending the broadcast packet after the wake-up signal has been sent.

16. The method of driving a portable information capturing device of claim 15, wherein the wake-up signal is a Bluetooth-enabled broadcast packet.

\* \* \* \* \*